United States Patent
Baba et al.

(10) Patent No.: US 10,027,192 B2
(45) Date of Patent: Jul. 17, 2018

(54) MOTOR WITH PERMANENT MAGNET EMBEDDED THEREIN, AND COMPRESSOR

(71) Applicant: Mitsubishi Electric Corporation, Tokyo (JP)

(72) Inventors: Kazuhiko Baba, Tokyo (JP); Koji Yabe, Tokyo (JP); Masahiro Nigo, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 14/888,100

(22) PCT Filed: Jun. 12, 2013

(86) PCT No.: PCT/JP2013/066232
§ 371 (c)(1),
(2) Date: Oct. 30, 2015

(87) PCT Pub. No.: WO2014/199466
PCT Pub. Date: Dec. 18, 2014

(65) Prior Publication Data
US 2016/0190880 A1    Jun. 30, 2016

(51) Int. Cl.
*H02K 1/27* (2006.01)
*H02K 1/02* (2006.01)

(52) U.S. Cl.
CPC .............. *H02K 1/276* (2013.01); *H02K 1/02* (2013.01); *H02K 2213/03* (2013.01)

(58) Field of Classification Search
CPC ............ H02K 1/02; H02K 1/27; H02K 1/276; H02K 1/2766; H02K 1/28; H02K 21/12; F25B 1/02; F25B 1/04
See application file for complete search history.

(56) References Cited

U.S. PATENT DOCUMENTS 6,437,473 B1 *   8/2002   Mobius .............. H02K 1/2766
                                                   29/598
6,944,929 B2 *   9/2005   Ogawa ...................... H01F 7/06
                                                   156/218

(Continued)

FOREIGN PATENT DOCUMENTS

CN        1379528 A     11/2002
JP     09-131009 A      5/1997

(Continued)

OTHER PUBLICATIONS

Office Action dated Mar. 28, 2017 issued in corresponding CN patent application No. 2013800770471 (and English translation).

(Continued)

*Primary Examiner* — Tran Nguyen
(74) *Attorney, Agent, or Firm* — Posz Law Group, PLC

(57) ABSTRACT

An interior permanent magnet motor includes: a rotator; a stator; a permanent magnet inserted into a magnet accommodating hole; and a slit formed on a radially outer side of the magnet accommodating hole. A space portion is ensured between a radially outer surface of the permanent magnet and a rotator core in each region opposed to the slit. The permanent magnet is apart from the rotator core via the space portion in the each region opposed to the slit.

8 Claims, 12 Drawing Sheets

(56) References Cited

U.S. PATENT DOCUMENTS

| | | | |
|---|---|---|---|
| 7,262,526 B2* | 8/2007 | Shiga | H02K 1/2786 310/156.28 |
| 2002/0145353 A1* | 10/2002 | Kimura | H02K 1/276 310/156.57 |
| 2006/0103253 A1* | 5/2006 | Shiga | H02K 1/2786 310/156.45 |
| 2006/0186752 A1* | 8/2006 | Matsumoto | H02K 1/276 310/156.53 |
| 2006/0273678 A1* | 12/2006 | Futami | H02K 1/276 310/156.53 |
| 2007/0290566 A1* | 12/2007 | Mizutani | H02K 1/276 310/156.56 |
| 2008/0224558 A1* | 9/2008 | Ionel | H02K 1/276 310/156.57 |
| 2009/0278417 A1* | 11/2009 | Mizuno | H02K 1/276 310/156.53 |

FOREIGN PATENT DOCUMENTS

| | | |
|---|---|---|
| JP | 10-285845 A | 10/1998 |
| JP | 2001-115963 A | 4/2001 |
| JP | 2008-022601 A | 1/2008 |
| JP | 2012-095474 A | 5/2012 |
| JP | 2012-172622 A | 9/2012 |
| JP | 2012-178902 A | 9/2012 |

OTHER PUBLICATIONS

International Search Report of the International Searching Authority dated Sep. 3, 2013 for the corresponding international application No. PCT/JP2013/066232 (and English translation).

Office action dated Sep. 30, 2017 corresponding to CN patent application No. 201380077047.1 (and English translation attached).

* cited by examiner

MOTOR WITH PERMANENT MAGNET EMBEDDED THEREIN, AND COMPRESSOR

CROSS REFERENCE TO RELATED APPLICATION

This application is a U.S. national stage application of PCT/JP2013/066232 filed on Jun. 12, 2013, the disclosure of which is incorporated herein by reference.

TECHNICAL FIELD

The present invention relates to an interior permanent magnet motor having a permanent magnet embedded in a rotator core, and a compressor including the same.

BACKGROUND ART

In recent years, due to an increasing interest in energy saving, there have been proposed many types of permanent magnet motors each of which uses a Nd—Fe—B rare-earth permanent magnet having a high residual flux density as a rotator, to thereby realize high efficiency.

In particular, as an electric motor for a compressor to be used in refrigeration equipment or air-conditioning equipment, an interior permanent magnet motor having a permanent magnet embedded in a rotator core is often used. In the rotator core, a plurality of magnet accommodating holes for embedding a plurality of permanent magnets are formed. In order to suppress electromagnetic exciting force generated at the electric motor, slits extended in a radial direction are formed in a core portion on an outer side of the permanent magnet.

For example, in a rotator of an interior permanent magnet motor disclosed in FIG. 2 of Patent Literature 1, a plurality of slits are formed in the vicinity of an outer peripheral portion of a core portion for a permanent magnet.

Besides, in some of the related-art electric motors, in order to operate an electric motor in a high temperature atmosphere of a compressor, much dysprosium (Dy) is added to increase J coercive force so that a rare-earth magnet is prevented from being demagnetized at high temperature. In particular, when an R32 coolant having a small global warming potential (GWP) is used, as compared to using a related-art 410A coolant, the temperature of the compressor is increased by 10° C. or more, and hence the addition amount of Dy is increased to increase the J coercive force.

For example, in a compressor disclosed in Patent Literature 2, a brushless DC motor and a compressor main body are concentrically arranged in a hermetically-sealed casing, a simple R32 coolant or an R32 rich mixed coolant is employed as a coolant to be taken, compressed, and discharged by the compressor main body, and J coercive force of a rare-earth magnet is set to 23 kOe or more.

CITATION LIST

Patent Literature

[PTL 1] JP 2008-022601 A (see mainly FIG. 2)
[PTL 2] JP 2001-115963 A (see mainly FIG. 12)

SUMMARY OF INVENTION

Technical Problem

However, in the above-mentioned interior permanent magnet motor disclosed in Patent Literature 1, when a demagnetizing field generated by a winding of the stator (a magnetic flux in a direction opposite to that of a magnetic flux generated by the permanent magnet) is applied to the rotator, because magnetic permeability of the magnet is substantially equal to that of air and the magnetic flux is difficult to pass therethrough, the magnetic flux tends to flow in a direction in which a magnetic resistance is small. At this time, the demagnetizing field tends to flow so as to pass through part of the core portion between magnet accommodating holes and the plurality of slits, in which the magnetic resistance is the smallest. However, the core portion is thin and the core portion is thus magnetically saturated, with the result that the demagnetizing field passes along a surface of the magnet opposed to the plurality of slits. Accordingly, the demagnetizing field is applied to the surface of the magnet to demagnetize the surface of the magnet, which is a problem.

Further, in the above-mentioned compressor disclosed in Patent Literature 2, R32 is used as the coolant and the J coercive force is set to 23 kOe or more in order to ensure the demagnetization resistance of the magnet, and hence dysprosium (Dy) added to the rare-earth magnet is increased to increase the cost. Moreover, much Dy is added and a residual flux density (Br) of the magnet is thus reduced, resulting in a reduction in efficiency.

The present invention has been made in view of the above-mentioned problems, and has an object to provide an interior permanent magnet motor capable of improving a demagnetization resistance of a surface of a magnet without relying on a demagnetization prevention action of a contained material, while suppressing electromagnetic exciting force generated at the electric motor.

Solution to Problem

In order to achieve the above-mentioned object, according to one embodiment of the present invention, there is provided an interior permanent magnet motor, including: a rotator; a stator arranged so as to be opposed to the rotator with an air gap; a plurality of permanent magnets respectively inserted into a plurality of magnet accommodating holes formed in a rotator core of the rotator; and a plurality of slits formed in the rotator core of the rotator on a radially outer side of each of the magnet accommodating holes, in which a space portion is ensured between a radially outer surface of each of the plurality of permanent magnets and the rotator core in each of regions opposed to the plurality of slits, and in which the surface of the permanent magnet is apart from the rotator core via the space portion in the each of the regions opposed to the plurality of slits.

Advantageous Effects of Invention

According to the one embodiment of the present invention, the demagnetization resistance of the surface of the magnet may be improved without relying on a demagnetization prevention action of a contained material, while suppressing electromagnetic exciting force generated at the electric motor.

DESCRIPTION OF EMBODIMENTS

Figure 1:
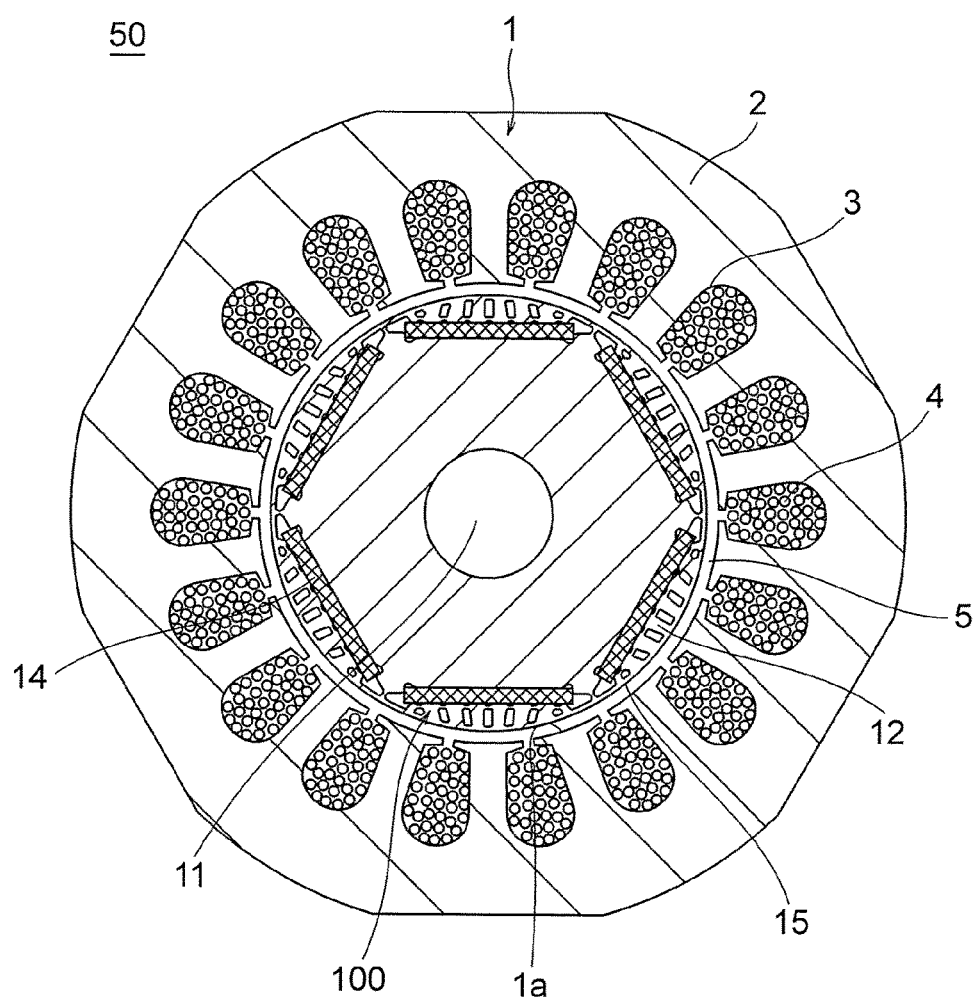
FIG. 1 is a cross-sectional view of an interior permanent magnet motor according to a first embodiment of the present invention.

Now, an interior permanent magnet motor and a compressor according to embodiments of the present invention are described with reference to the accompanying drawings. Note that, in the drawings, the same reference symbols represent the same or corresponding parts.

First Embodiment

Figure 2:
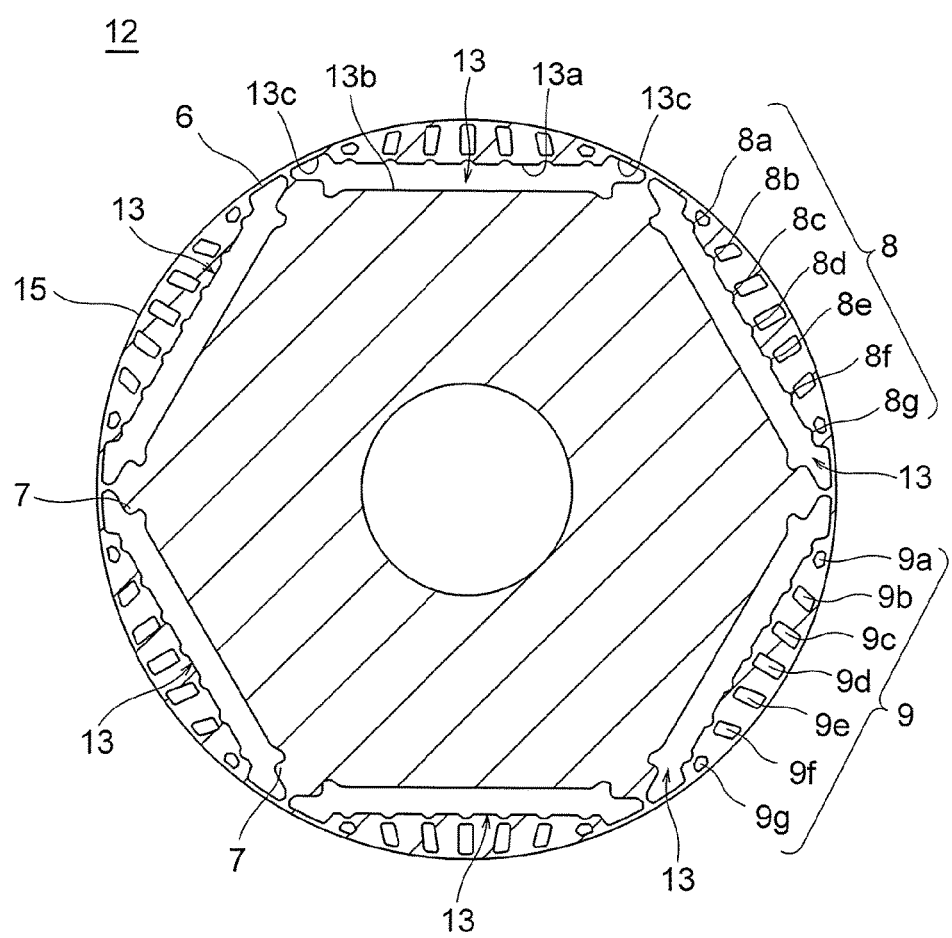
FIG. 2 is a cross-sectional view of a rotator core illustrated in FIG. 1.
Figure 3:
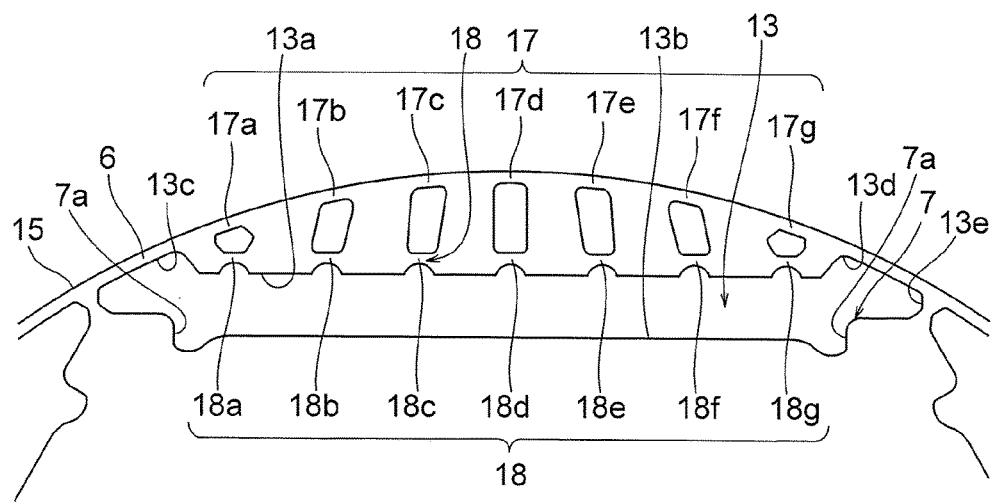
FIG. 3 is a partial enlarged view of one pole of the rotator core illustrated in FIG. 2.
Figure 4:
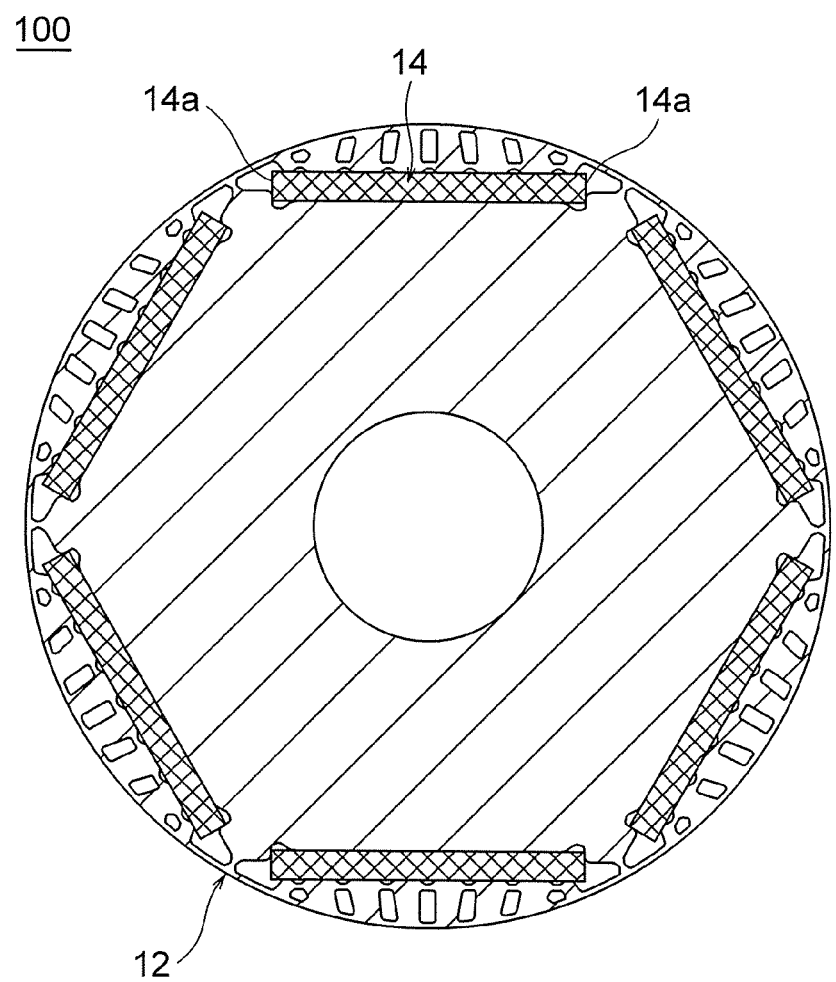
FIG. 4 is a view for illustrating a rotator having a rare-earth magnet accommodated in the rotator core of FIG. 2.

FIG. 1 is a cross-sectional view of an interior permanent magnet motor according to a first embodiment of the present invention, FIG. 2 is a cross-sectional view of a rotator core illustrated in FIG. 1, FIG. 3 is a partial enlarged view of one pole of the rotator core illustrated in FIG. 2, and FIG. 4 is a view of a rotator having a Nd—Fe—B rare-earth magnet accommodated in the rotator core of FIG. 2. Note that, the drawing sheets of FIG. 1 to FIG. 4 are each a surface having, as the normal, a rotary shaft of a rotator described later.

In FIG. 1, an interior permanent magnet motor 50 according to the first embodiment of the present invention includes a stator 1 having an annular shape and a rotator 100. The stator 1 includes a stator core 2 having a circular shape, a plurality of slots 3 formed in an inner peripheral portion of the stator core 2 at equiangular pitches in a circumferential direction (a direction of a circle having a rotary shaft of the rotator as the center on a surface having the rotary shaft as the normal; a direction of a rotation locus of the rotator 100), and a coil 4 accommodated in each of the slots 3.

The rotator 100 is arranged on the inner peripheral side of the stator 1 so as to be rotatable. An air gap 5 having a cylindrical shape is formed between an outer peripheral surface 15 of the rotator 100 (rotator core 12) and an inner peripheral surface 1a of the stator 1. Note that, the stator 1 illustrated in FIG. 1 is a distributed winding stator as an example, but the stator 1 may be a concentrated winding stator.

Meanwhile, the rotator 100 includes, as a main configuration thereof, a rotary shaft 11, the rotator core 12, and a plurality of permanent magnets 14. Rotational energy is transmitted from a drive source to the rotary shaft 11, and the rotator core 12 arranged around the rotary shaft 11 is rotated by the rotational energy. The rotator core 12 and the rotary shaft 11 are coupled to each other by, for example, shrink fitting and press fitting.

Further, the details of the rotator are described with reference to FIG. 2 and FIG. 3. FIG. 2 and FIG. 3 are each an illustration of the rotator core 12 before the permanent magnet 14 is accommodated therein. The rotator core 12 is manufactured by laminating, in an extending direction of the rotary shaft 11 (the front-back direction of the drawing sheet of FIG. 2), a plurality of silicon steel sheets (constituent sheets) each punched out into a predetermined shape with a die. The outer peripheral surface 15 of the rotator core 12 is formed into a cylindrical shape.

Six magnet accommodating holes 13 are formed in the rotator core 12 along a circumferential direction. The six magnet accommodating holes 13 have the same shape. Moreover, each of the six magnet accommodating holes 13 is expanded over an equal angular range, and radial positions of respective portions of the magnet accommodating holes 13 are also in the same mode for the six magnet accommodating holes 13.

Each of the magnet accommodating holes 13 includes an outer defining line 13a, an inner defining line 13b, and a pair of end lines 13c in a radial direction (a direction of a radius having the rotary shaft of the rotator as the center on the surface having the rotary shaft as the normal) on the drawing sheet of FIG. 2. The pair of end lines 13c connects end portions 13d (see FIG. 3) of the outer defining line 13a and end portions 13e (see FIG. 3) of the inner defining line 13b to each other in the vicinity of the outer peripheral surface 15 of the rotator core 12. Most part of each of the outer defining line 13a and the inner defining line 13b (except for the end portions) is extended in a direction orthogonal to the radial direction.

The rotator core 12 includes an outer peripheral thin core portion 6 between the outer peripheral surface 15 of the rotator core 12 and each of the end lines 13c of each of the magnet accommodating holes 13.

With the configuration of the rotator core 12 as described above, a magnetic resistance in the vicinity of the both end portions (end lines 13c) of the magnet accommodating hole 13 can be increased. Accordingly, a short-circuit flux of the magnet can be reduced and a higher torque can thus be realized.

In the outer defining line 13a of the magnet accommodating hole 13, a plurality of recessed portions 8 (8a to 8g) protruding to the outer peripheral surface 15 side are formed. Those recessed portions 8 are formed at positions opposed to slits 9 (9a to 9g) described later. In the first embodiment, one recessed portion 8 is formed for one slit 9 in a corresponding manner, that is, the recessed portions 8 are formed as many as the number of the slits 9.

Moreover, a clearance between the outer defining line 13a and each of the plurality of slits 9 is set to substantially the same over one pole. The depths of the plurality of recessed portions 8 in the radial direction are also set to substantially the same over one pole. The depth dimension of the recessed portion 8 is sufficiently smaller than the thickness dimension of the permanent magnet 14 in the radial direction, and in this embodiment, the thickness dimension of the magnet is 2 mm whereas the depth dimension of the recessed portion 8 is 0.6 mm. Note that, the depth of the recessed portion is not limited to this value, and any value is suitable as long as the depth is ⅓ of the thickness dimension of the magnet in the radial direction or less.

Moreover, the width dimension of the recessed portion 8 is the largest at an opening portion thereof connected to the outer defining line 13a (a base portion of protrusion of the above-mentioned protrusion), and the width dimension is substantially equal to the width dimension of the slit 9 described later.

Further, at the both ends of the inner defining line 13b of each of the magnet accommodating holes 13, a pair of projecting portions 7 is formed. The pair of projecting portions 7 is protruded radially outward. Those projecting portions 7 have a positioning function of preventing the permanent magnet 14 from deviating in the circumferential direction.

A height of the projecting portion 7 is set to ensure such a dimension that allows, when the permanent magnet 14 is inserted, surface contact between an end surface 14a (see FIG. 4) of the permanent magnet 14 in a longitudinal direction thereof and a side surface 7a of the projecting portion 7. It is only required to ensure the surface-contact portion having a dimension capable of preventing the deviation of the permanent magnet 14 at a lower limit of a dimensional tolerance of the permanent magnet 14. In this example, the height of the projecting portion 7 is approximately 0.5 mm.

Moreover, in the rotor core 12, the plurality of (seven) slits 9 (9a to 9g) are formed in part of the core portion between the magnet accommodating hole 13 and the outer peripheral surface 15. The slits 9 (9a to 9g) each do not have any opening portion connecting to the magnet accommodating hole 13 and the outer peripheral surface 15 but have a closed shape, and are located inside the rotor core 12. Moreover, in each of units of the magnetic poles, the plurality of slits 9 are extended substantially in the radial direction. The length extended substantially in the radial direction is the longest for the slit 9d at the magnetic pole center portion. The length is reduced as approaching the inter-pole portion, and is the shortest for the slits 9a and 9g at the inter-pole portions.

In the rotor core 12, thin outer core portions 17 (17a to 17g) are formed between each of the plurality of slits 9 and the outer peripheral surface 15.

Moreover, in the rotor core 12, thin inner core portions 18 (18a to 18g) are formed between the plurality of slits 9 (9a to 9g) and the recessed portions 8 (8a to 8g) formed so as to be opposed to the slits 9 (9a to 9g).

The thickness of each of the plurality of outer core portions 17 and each of the plurality of inner core portions 18 is set to approximately the sheet thickness of the magnetic steel sheet, and is approximately 0.2 mm to approximately 0.5 mm, for example.

With the slits 9, the recessed portions 8, and the inner core portions 18 formed as described above, magnetic fluxes generated by the winding of the stator 1 pass not through the surface of the permanent magnet 14 but through the inner core portions 18 (18a to 18g). Moreover, even when the inner core portions are magnetically saturated, the magnetic fluxes generated by the winding of the stator 1 pass through space inside the recessed portions 8 (8a to 8g), and hence a demagnetization resistance of the surface of the permanent magnet 14 on the outer periphery side can be improved.

Figure 5:
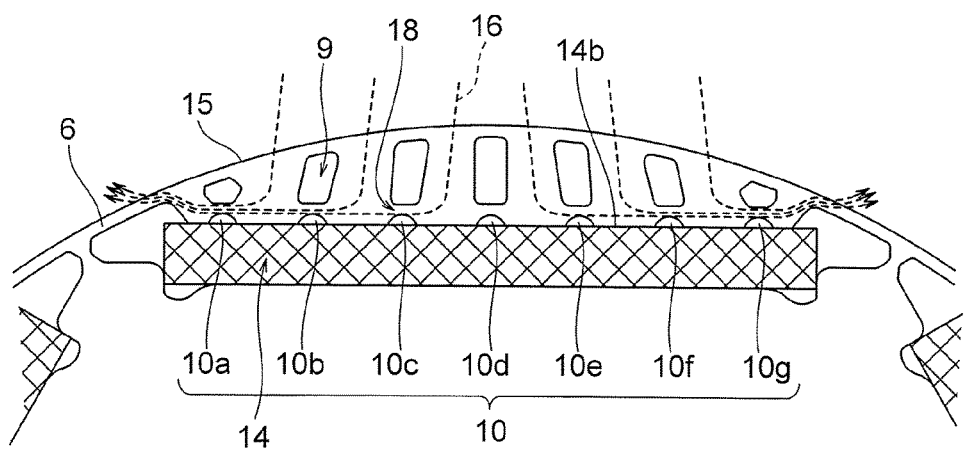
FIG. 5 is a conceptual view for illustrating a flow of a magnetic flux due to a demagnetizing field.

FIG. 4 and FIG. 5 are illustrations of the rotator core of FIG. 2 that has a rare-earth magnet accommodated therein. As illustrated in FIG. 4 and FIG. 5, the corresponding permanent magnet 14 is accommodated in each of the magnet accommodating holes 13. That is, the permanent magnets 14 forming the magnetic poles of the rotator core 12 are arranged as many as the number of poles in the circumferential direction of the rotator core 12, and are magnetized so that the N pole and the S pole are alternately positioned.

Moreover, in a state in which the corresponding permanent magnet 14 is inserted into each of the magnet accommodating holes 13, a plurality of space portions 10 (10a to 10g) are formed between the plurality of inner core portions 18 and a radially outer surface 14b of the permanent magnet 14, the space portions 10 being ensured due to the presence of the plurality of recessed portions 8. In other words, the space portion 10 is ensured between the radially outer surface 14b of each of the plurality of permanent magnets 14 and the rotator core 12 in each of the regions opposed to the plurality of slits 9, and the surface 14b of the permanent magnet 14 is apart from the rotator core 12 via the space portion 10 in each of the regions opposed to the plurality of slits 9. That is, the portion of the radially outer surface 14b of the permanent magnet 14 at the position opposed to the slit 9 is not in abutment against the portion of the rotator core 12 (outer defining line 13a) but faces the rotator core 12 with the corresponding space portion 10 interposed therebetween.

The permanent magnet 14 is a Nd.Fe.B rare-each magnet having a residual flux density of 1.2 T or more at normal temperature (20° C.) and J coercive force of less than 23 kOe at normal temperature (20° C.). The shape of the magnet is a flat plate shape, and the permanent magnet 14 is arranged so as to be sandwiched by the pair of projecting portions 7.

The slits 9, the recessed portions 8, and the inner core portions 18 are formed as described above, and hence, as illustrated in FIG. 5, in the rotator core 12, a magnetic flux 16 passes between the plurality of slits 9 to pass through the outer peripheral thin core portion 6 via the inner core portion 18 and the recessed portion 8 (space portion 10) while avoiding the radially outer surface of the permanent magnet 14.

As described above, according to the interior permanent magnet motor of the first embodiment, there can be provided an electric motor capable of, while suppressing the electromagnetic exciting force generated at the electric motor, preventing the demagnetizing field generated by the stator winding from passing through the radially outer surface of the permanent magnet, by the plurality of slits, to thereby suppress the demagnetization of the surface portion of the permanent magnet and achieve a small reduction in torque. Moreover, such demagnetization suppression of the surface portion of the permanent magnet is realized without relying on a demagnetization prevention action of a contained material of the permanent magnet, and hence a usage amount of Dy contained in the rare-earth magnet can be reduced, to thereby obtain a cost reduction effect. Further, the reduction in usage amount of Dy leads to an increase in residual flux density of the magnet, to thereby realize higher torque. That is, according to the first embodiment, a great advantage is obtained: both of the suppression of the electromagnetic exciting force and the suppression of the demagnetization of the surface portion of the permanent magnet can be achieved while promoting both of the cost reduction and the higher torque.

Moreover, when the electric motor is used as an electric motor for a compressor, another advantage is obtained: a refrigerant flows through the space portions formed of the recessed portions, and hence a temperature of the permanent magnet can be decreased and the demagnetization resistance can be improved.

Figure 6:
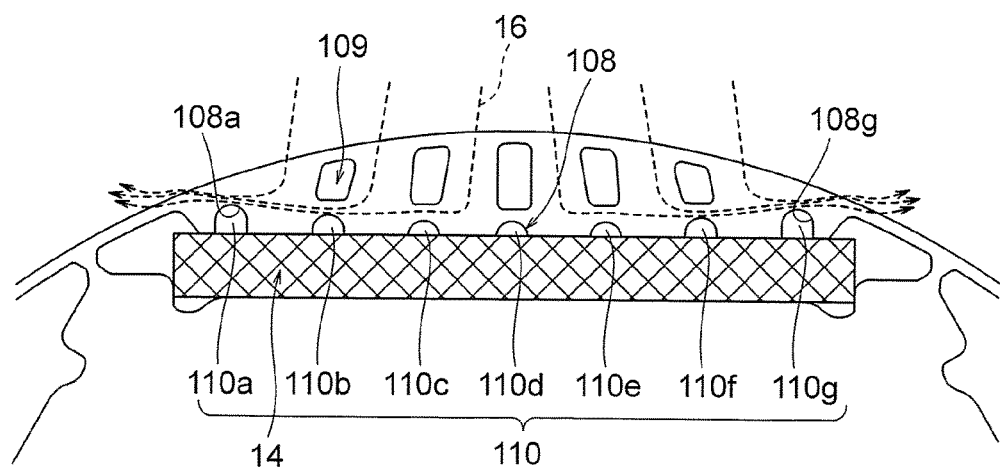
FIG. 6 is a cross-sectional view for illustrating a modified example of the rotator of FIG. 4.
Figure 7:
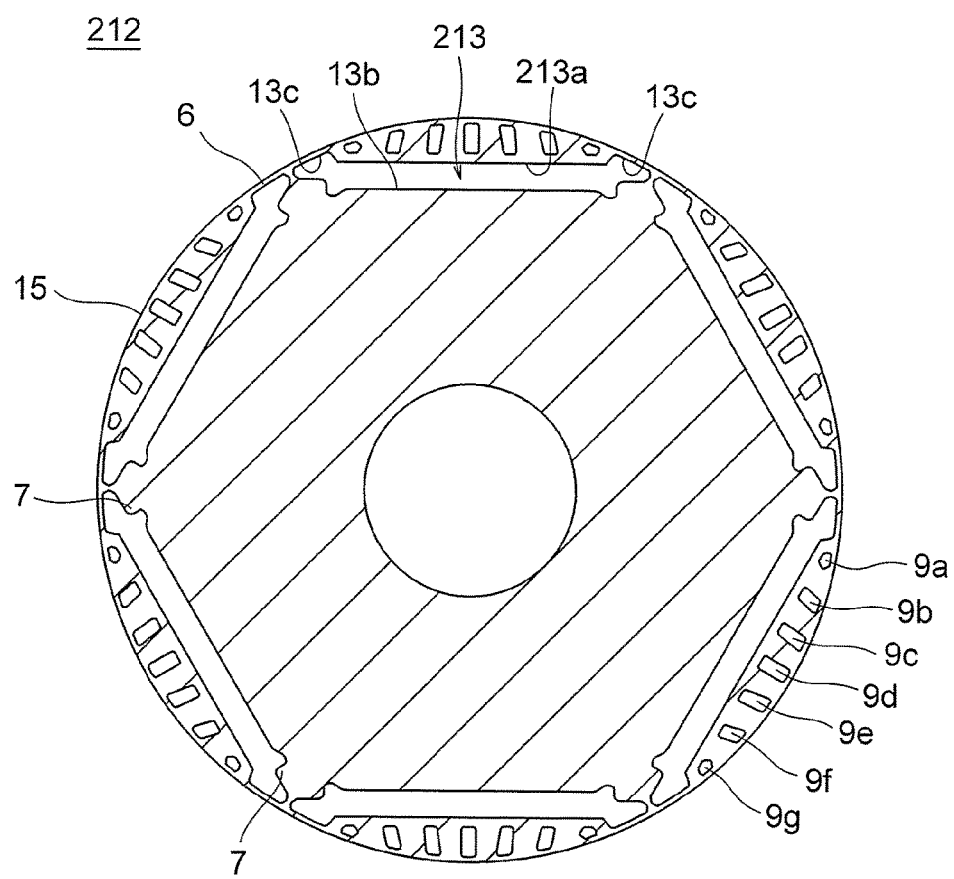
FIG. 7 is a view in the same mode as FIG. 2 according to a second embodiment of the present invention.
Figure 8:
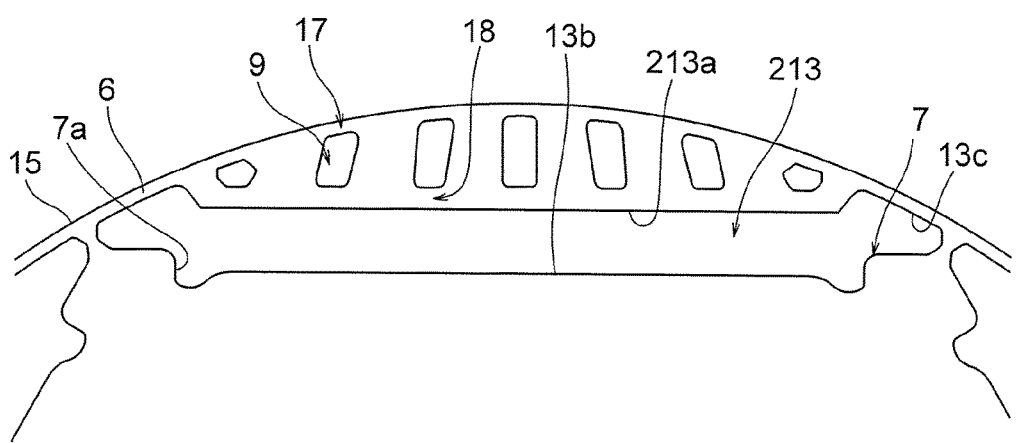
FIG. 8 is a view in the same mode as FIG. 3 according to the second embodiment.
Figure 9:
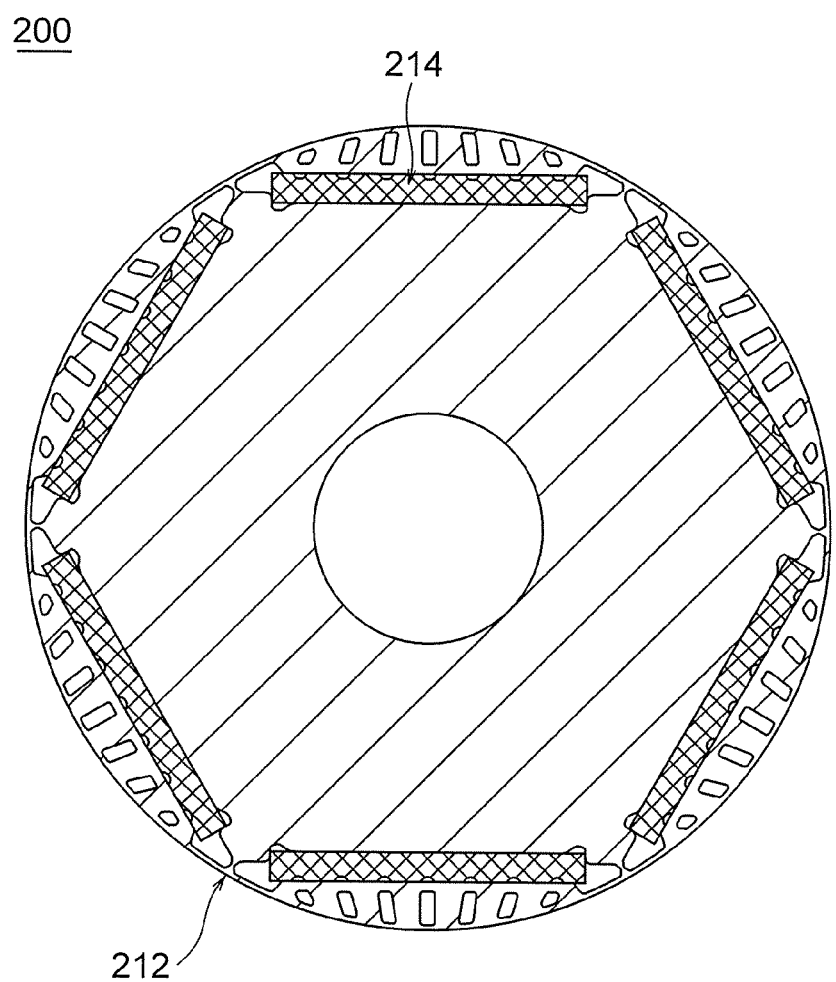
FIG. 9 is a view in the same mode as FIG. 4 according to the second embodiment.

Note that, in the description referring to FIG. 1 to FIG. 5 above, the depth dimensions of all of the plurality of recessed portions are set to the same, but the first embodiment is not limited thereto. For example, as illustrated in FIG. 6, for one pole, a plurality of slits 109 and a plurality of recessed portions 108 are formed in such a mode that the recessed portions 108 are formed at least at positions opposed to the slits 109, and those recessed portions may be formed such that the recessed portion closer to the magnetic pole center portion has a smaller (shallower) depth dimension whereas the recessed portion closer to the inter-pole portion has a larger (deeper) depth dimension. Note that, in this case, as illustrated in FIG. 6, no slit may be formed at the positions opposed to the recessed portion 108a and the recessed portion 108g formed at the both end portions (near the inter-pole portions), or minute slits may be formed at the positions opposed to the recessed portions near the inter-pole portions. Also in such a modified mode in which the plurality of recessed portions having the different depth dimensions are used, a concentrated flow of the magnetic fluxes through the both endportions of the permanent magnet can be alleviated in addition to improve the demagnetization resistance of the surface of the permanent magnet, to thereby obtain an effect that the demagnetization resistance of the both end portions of the permanent magnet can be improved.

Second Embodiment

Next, with reference to FIG. 7 to FIG. 10, an interior permanent magnet motor according to a second embodiment of the present invention is described. FIG. 7, FIG. 8, FIG. 9, and FIG. 10 are views relating to the second embodiment and are in the same modes as FIG. 2, FIG. 3, FIG. 4, and FIG. 5, respectively. Note that, the second embodiment is similar to the first embodiment described above except for parts described below.

As described above, in the present invention, the space portion is ensured between the radially outer surface of each of the plurality of permanent magnets and the rotator core in each of the regions opposed to the plurality of slits. In the first embodiment, those space portions are ensured by the plurality of recessed portions formed in the outer defining line of the magnet accommodating hole, but in the second embodiment, those space portions are ensured by a plurality of recessed portions formed in the radially outer surface of the permanent magnet.

A rotator 200 according to the second embodiment includes a rotator core 212 having a plurality of magnet accommodating holes 213. An outer defining line 213a of each of the magnet accommodating holes 213 is extended in a planar manner in a direction orthogonal to the radial direction, except for end portions thereof. That is, in the outer defining line 213a, recessed portions corresponding to the recessed portions 8 of the first embodiment are not formed.

Figure 10:
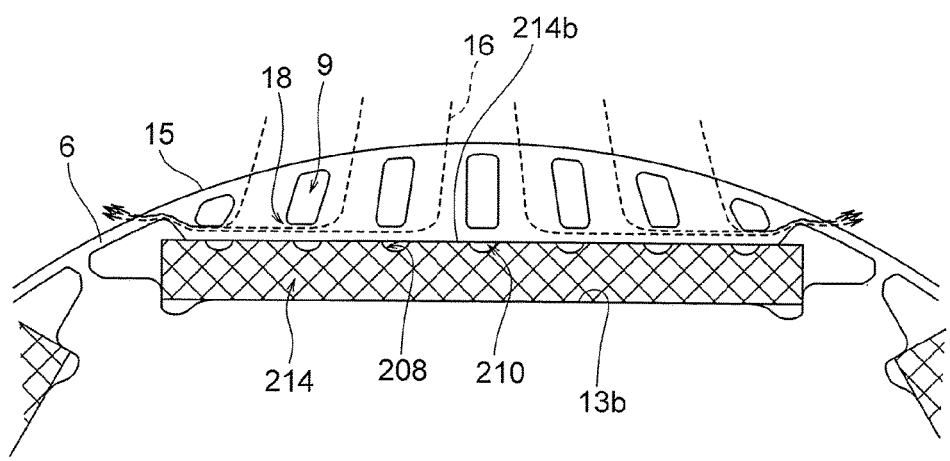
FIG. 10 is a view in the same mode as FIG. 5 according to the second embodiment.

Meanwhile, in a radially outer surface 214b of a permanent magnet 214, which is opposed to the corresponding outer defining line 213a, a plurality of recessed portions 208 are formed so as to protrude to the inner defining line 13b side in a state in which the permanent magnet 214 is inserted. Further, as illustrated in FIG. 10, a plurality of space portions 210 are formed between the plurality of inner core portions 18 and the radially outer surface 214b of the permanent magnet 214, the space portions 210 being ensured due to the presence of the plurality of recessed portions 208. That is, also in the second embodiment, the space portion 210 is ensured between the radially outer surface 214b of each of the plurality of permanent magnets 214 and the rotator core 212 in each of the regions opposed to the plurality of slits 9, and the surface 214b of the permanent magnet 214 is apart from the rotator core 212 via the space portion 10 in each of the regions opposed to the plurality of slits 9. Note that, the depth and width dimensions of those recessed portions 208 are similar to the dimensions of the recessed portions described in the first embodiment.

Also according to the second embodiment configured as described above, the advantages similar to those of the above-mentioned first embodiment are obtained, and hence the demagnetization resistance of the surface of the magnet can be improved without relying on the demagnetization prevention action of the contained material, while suppressing the electromagnetic exciting force generated at the electric motor.

Third Embodiment

Figure 11:
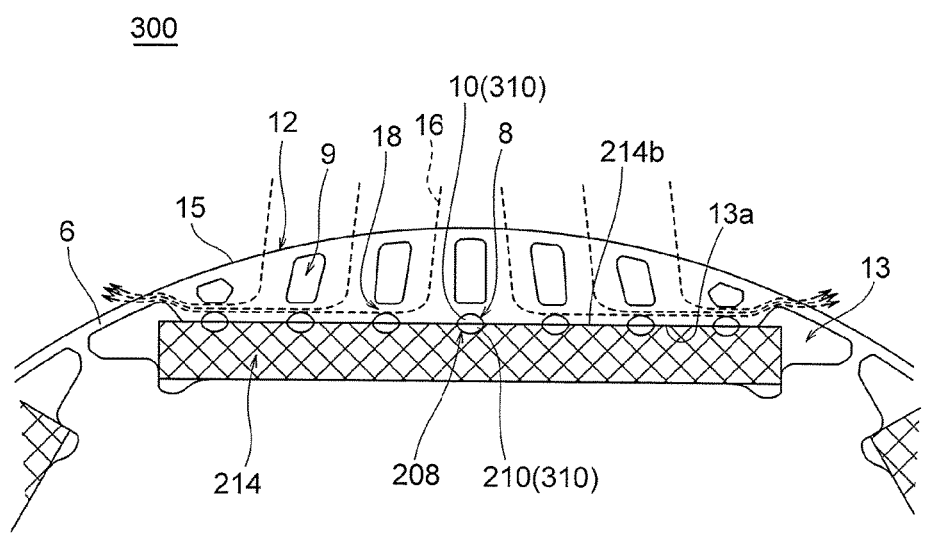
FIG. 11 is a view in the same mode as FIG. 5 according to a third embodiment of the present invention.

Next, with reference to FIG. 11, an interior permanent magnet motor according to a third embodiment of the present invention is described. FIG. 11 is a view relating to the third embodiment and is in the same mode as FIG. 5. Note that, the third embodiment is also similar to the first embodiment described above except for parts described below.

A rotator 300 according to the third embodiment includes both of the recessed portion 8 of the first embodiment and the recessed portion 208 of the second embodiment. That is, the plurality of recessed portions 8 are formed in the outer defining line 13a of the magnet accommodating hole 13 of the rotator 300, and the plurality of recessed portions 208 are formed in the radially outer surface 214b of the permanent magnet 214 of the rotator 300. Further, each of a plurality of space portions 310 ensured in each of the regions opposed to the plurality of slits 9, which is space obtained by combining the recessed portion 8 of the rotator core 12 and the recessed portion 208 of the permanent magnet 214, is ensured by the pair of recessed portions 8 and 208.

Also according to the third embodiment, the advantages similar to those of the above-mentioned first embodiment are obtained, and hence the demagnetization resistance of the surface of the magnet can be improved without relying on the demagnetization prevention action of the contained material, while suppressing the electromagnetic exciting force generated at the electric motor. Moreover, a larger space portion can be easily and efficiently ensured in each of the regions opposed to the plurality of slits 9, and hence there can be obtained an interior permanent magnet synchronous motor in which the demagnetization resistance of the permanent magnet surface portion is further improved.

Note that, with regard to the second and third embodiments described above, the slit formed in the rotator core and the corresponding recessed portion formed in the outer defining line and/or the radially outer surface can be formed also in the mode illustrated in FIG. 6.

Fourth Embodiment

Next, as a fourth embodiment of the present invention, a rotary compressor having the interior permanent magnet motor of any one of the above-mentioned first to third embodiments mounted therein is described. Note that, the present invention includes the compressor having the interior permanent magnet motor of any one of the above-mentioned first to third embodiments mounted therein, but the type of the compressor is not limited to a rotary compressor.

Figure 12:
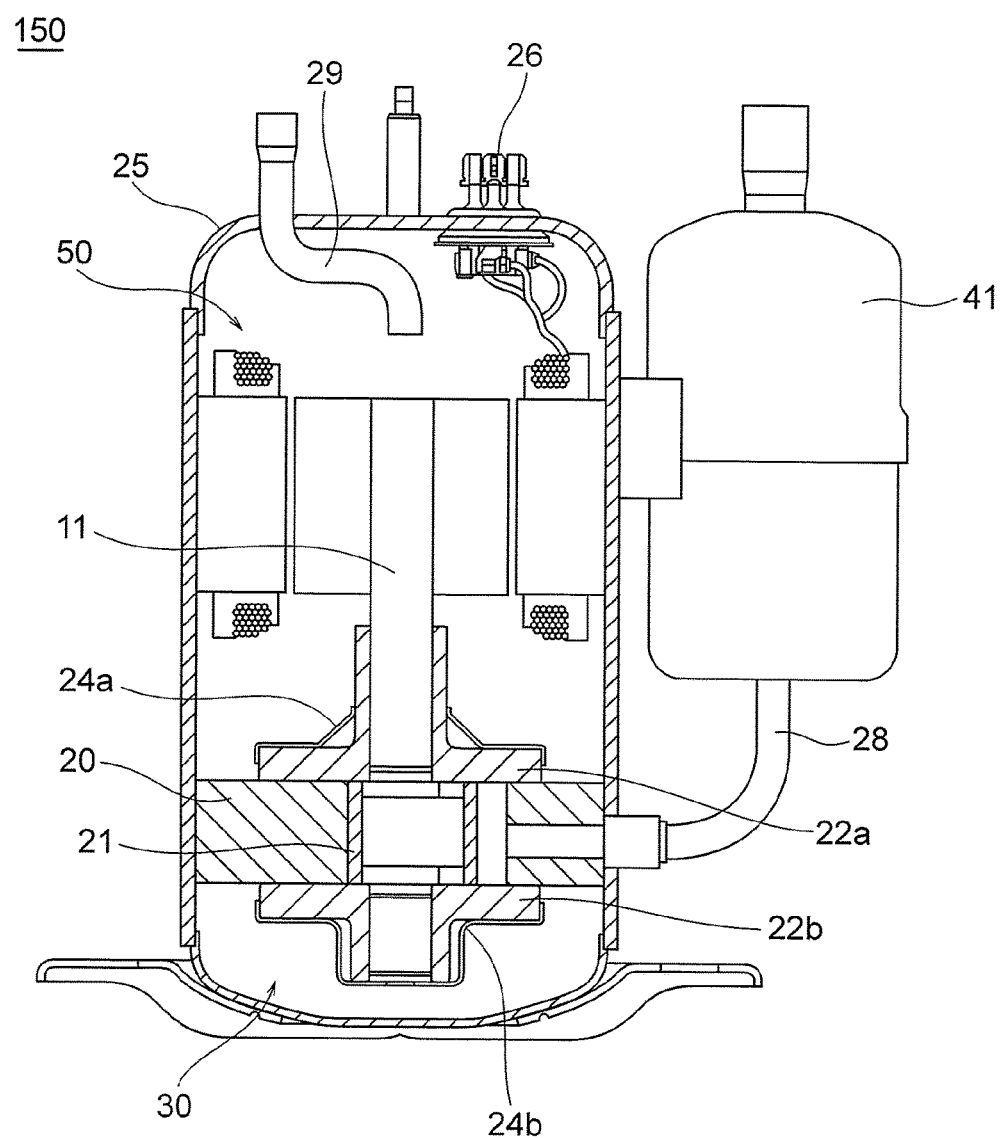
FIG. 12 is a longitudinal sectional view of a rotary compressor having an interior permanent magnet motor mounted therein according to a fourth embodiment of the present invention.

FIG. 12 is a longitudinal sectional view of the rotary compressor having the interior permanent magnet motor mounted therein. A rotary compressor 150 includes the interior permanent magnet motor 50 (motor element) and a compression element 30 in a hermetically-sealed container 25. Although not illustrated, at a bottom portion of the hermetically-sealed container 25, a refrigerant oil for lubricating each of sliding portions of the compression element 30 is stored.

The compression element 30 includes, as main components thereof, a cylinder 20 arranged in a vertically stacked state, the rotary shaft 11 rotated by the motor, a piston 21 to be fitted by insertion into the rotary shaft 11, a vane (not shown) dividing an inside of the cylinder 20 into an intake side and a compression side, an upper frame 22a and a lower frame 22b being a pair of upper and lower frames into which the rotary shaft 11 is to be rotatably fitted by insertion, for closing axial end surfaces of the cylinder 20, and mufflers 24a and 24b mounted on the upper frame 22a and the lower frame 22b, respectively.

The stator 1 of the interior permanent magnet motor 50 is directly fixed to the hermetically-sealed container 25 by a method such as shrink fitting or welding and is held thereby. The coil 4 of the stator 1 is supplied with power from a glass terminal 26 fixed to the hermetically-sealed container 25.

The rotator 100 is arranged with an air gap secured on the inner diameter side of the stator 1, and is held in a rotatable state by the bearing portions (upper frame 22a and lower frame 22b) of the compression element 30 arranged at the lower part of the rotary compressor 150 via the rotary shaft 11 in the center portion of the rotator 100.

Next, an operation of the rotary compressor 150 is described. A refrigerant gas supplied from an accumulator 41 is taken into the cylinder 20 through an intake pipe 28 fixed to the hermetically-sealed container 25. The interior permanent magnet motor 50 is rotated by energization of an inverter so that the piston 21 fitted to the rotary shaft 11 is rotated in the cylinder 20. With this, the coolant is compressed in the cylinder 20. The compressed coolant having high temperature passes through the mufflers 24a and 24b, and then passes through air holes of the interior permanent magnet motor 50 and the like to rise in the hermetically-sealed container 25. In this manner, the compressed coolant is supplied to a high-pressure side of the refrigeration cycle through a discharge pipe 29 provided to the hermetically-sealed container 25.

Note that, as the coolant for the rotary compressor 150, hitherto known R410A, R407C, R22, or the like is used, but any coolant such as a coolant having a low global warming potential (GWP) can also be applied. In view of the prevention of global warming, a low GWP coolant is desirable. As typical examples of the low GWP coolant, the following coolants are given.

(1) A halogenated hydrocarbon having in its composition a carbon-carbon double bond, such as HFO-1234yf ($CF_3CF=CH_2$). HFO is an abbreviation of the term "hydro-fluoro-olefin", and the olefin refers to an unsaturated hydrocarbon having one double bond. Note that, the GWP of HFO-1234yf is 4.

(2) A hydrocarbon having in its composition a carbon-carbon double bond, such as R1270 (propylene). Note that, the GWP of R1270 is 3, which is smaller than that of HFO-1234yf, and the combustibility of R1270 is higher than that of HFO-1234yf.

(3) A mixture containing at least any one of a halogenated hydrocarbon having in its composition a carbon-carbon double bond or a hydrocarbon having in its composition a carbon-carbon double bond, such as a mixture of HFO-1234yf and R32. HFO-1234yf causes a large pressure loss because HFO-1234yf is a low-pressure refrigerant. Thus, the performance of the refrigeration cycle (particularly in an evaporator) is liable to deteriorate. Accordingly, a mixture of HFO-1234yf and R32, R41, or the like, which is a higher-pressure refrigerant than HFO-1234yf, is promising in practical use.

Among the above-mentioned low GWP coolants, the R32 coolant is neither toxic nor highly flammable, and thus particularly attracts attention. Moreover, when the R32 coolant is used for the rotary compressor 150, such a characteristic is provided that, as compared to using the hitherto used R410A, R4070, R22, or the like, an internal temperature of the rotary compressor 150 is increased by approximately 20° C. or more.

The internal temperature of the rotary compressor 150 changes depending on compression load states (rotational speed; compression load torque; coolant), and the temperature particularly has high dependence on the rotational speed in a steady state in which the temperature is stable. For example, when the R410 coolant is used, a rise in internal temperature of the rotary compressor with respect to the rotational speed is 50° C. to 60° C. at low speed driving, is 70° C. to 80° C. at intermediate speed driving, and is 90° C. to 110° C. at high speed driving. Accordingly, such a characteristic is provided that the internal temperature of the rotary compressor 150 is increased as the rotational speed of the rotary compressor 150 is increased. When the R32 coolant is used, as compared to using the R410A coolant, the internal temperature of the rotary compressor 150 is further increased by approximately 20° C.

In the rotary compressor having the configuration described above, the interior permanent magnet motor having the large demagnetization resistance is used. Thus, such an effect is provided that it is possible to provide a highly reliable compressor in which, even when J coercive force is reduced due to a rise in temperature of the compressor, demagnetization of the magnet does not occur. Moreover, even when the interior permanent magnet motor is operated in a high temperature atmosphere of the rotary compressor, the residual flux density of the magnet can be increased to increase the torque of the electric motor while reducing the usage amount of Dy added to the rare-earth magnet to achieve a lower cost. Thus, it is possible to provide a compressor with high efficiency.

Although the details of the present invention are specifically described above with reference to the exemplary embodiments, it is apparent that persons skilled in the art may adopt various modifications based on the basic technical concepts and teachings of the present invention.

REFERENCE SIGNS LIST 1 stator, 8, 108, 208 recessed portion, 9, 109 slit, 10, 110, 210, 310 space portion, 12, 212 rotator core, 13, 213 magnet accommodating hole, 13a, 213a outer defining line, 14, 214 permanent magnet, 14b, 214b surface, 50 interior permanent magnet motor, 100, 200, 300 rotator

The invention claimed is:
1. An interior permanent magnet motor, comprising:
a rotator that includes a rotator core formed with a plurality of magnetic accommodating holes;
a stator arranged so as to be opposed to the rotator with an air gap;
a plurality of permanent magnets respectively inserted into the plurality of magnet accommodating holes formed in the rotator core of the rotator;
a plurality of slits formed in the rotator core of the rotator on a radially outer side of each of the magnet accommodating holes;

a plurality of space portions located between a radially outer surface of each of the plurality of permanent magnets and the rotator core in each of regions opposed to the plurality of slits, the plurality of space portions are spaced apart from each other along a circumferential direction of the rotator core across from each of the plurality of slits, and a plurality of recessed portions formed in an outer defining line of each of the magnet accommodating holes at positions opposed to the plurality of slits, wherein the radially outer surface of the permanent magnet is separated from the rotator core via the plurality of space portions located in the each of the regions opposed to the plurality of slits, the plurality of space portions are ensured by the plurality of recessed portions, and for one pole, the plurality of recessed portions are formed such that a recessed portion closer to a magnetic pole center portion has a smaller depth dimension whereas a recessed portion closer to an inter-pole portion has a larger depth dimension.

2. The interior permanent magnet motor according to claim 1, wherein a plurality of recessed portions are formed in the radially outer surface of the each of the plurality of permanent magnets at the positions opposed to the plurality of slits, and wherein the plurality of space portions are ensured by the plurality of recessed portions formed in the outer defining line and the plurality of recessed portions formed in the radially outer surface.

3. The interior permanent magnet motor according to claim 1, wherein the depth of the plurality of recessed portions is ⅓ of a thickness dimension of the permanent magnet in a radial direction or less.

4. The interior permanent magnet motor according to claim 1, wherein the permanent magnet comprises a Nd.Fe.B rare-earth magnet having a residual flux density of 1.2 T or more at normal temperature (20° C.) and J coercive force of less than 23 kOe at normal temperature (20° C.).

5. A compressor, comprising, in a hermetically-sealed container:

an electric motor; and a compression element, the electric motor comprising the interior permanent magnet motor of claim 1.

6. The interior permanent magnet motor according to claim 2, wherein the depth of the plurality of recessed portions is ⅓ of a thickness dimension of the permanent magnet in a radial direction or less.

7. The interior permanent magnet motor according to claim 2, wherein, for one pole, the plurality of recessed portions formed in the outer defining line and the plurality of recessed portions formed in the radially outer surface are formed such that the recessed portion closer to the magnetic pole center portion has the smaller depth dimension whereas the recessed portion closer to the inter-pole portion has the larger depth dimension.

8. The interior permanent magnet motor according to claim 1, wherein the plurality of recessed portions being formed such that the recessed portion closer to the magnetic pole center portion has the smaller depth dimension whereas the recessed portion closer to the inter-pole portion has the larger depth dimension alleviates a concentrated flow of magnetic flux through both end portions of the permanent magnet and increases the demagnetization resistance of the surface and both end portions of the permanent magnet.

* * * * *